Patented Oct. 21, 1924.

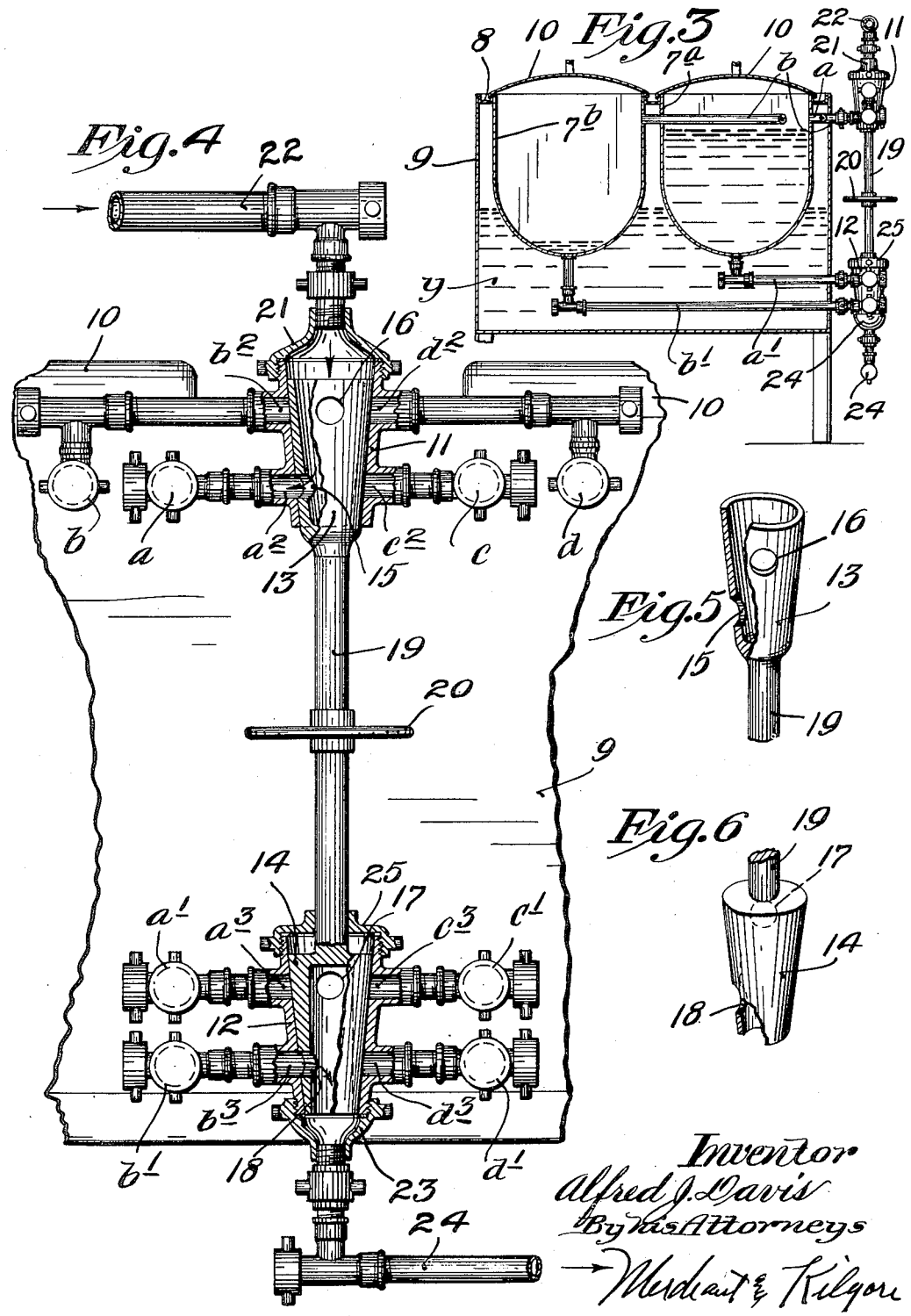

1,512,748

UNITED STATES PATENT OFFICE.

ALFRED J. DAVIS, OF MINNEAPOLIS, MINNESOTA.

TEMPERATURE-MAINTAINING APPARATUS.

Application filed July 20, 1922. Serial No. 576,234.

*To all whom it may concern:*

Be it known that I, ALFRED J. DAVIS, a citizen of the United States, residing at Minneapolis, in the county of Hennepin and State of Minnesota, have invented certain new and useful Improvements in Temperature-Maintaining Apparatus; and I do hereby declare the following to be a full, clear, and exact description of the invention, such as will enable others skilled in the art to which it appertains to make and use the same.

My invention provides an extremely simple and highly efficient temperature-maintaining apparatus for use in pasteurizing or sterilizing milk, cream and the like, and, generally stated, the invention consists of the novel construction, combinations and arrangements of parts hereinafter described and defined in the claims.

Hitherto, there has been devised very efficient heaters for bringing the temperature of cream and milk to the pasteurizing or sterilizing degree. In efficient heaters, the milk or cream has been caused to pass between closely adjacent hot walls and such devices have not been able to hold, at one time, but a very small quantity of the liquid and the liquid has necessarily been passed quite rapidly from such devices after they have been properly heated. It is a known fact that cream or milk can be properly sterilized when maintained for but a short time at the sterilizing temperature when such temperature closely approaches the boiling point and is liable to give to the cream or milk a slightly scorched taste. It is also known that the milk or cream may be properly sterilized by maintaining the same, for a considerable period of time, at a temperature that is so much below the boiling point that no scorched or other noticeable or objectionable taste will be produced in the milk or cream.

My invention provides a temperature-maintaining apparatus especially adapted for use as an auxiliary to a heater, in which latter the cream or milk has first been brought to the proper temperature and properly heated while in a thin film. So far as this invention is concerned, the primary heater may be of any suitable form.

In the accompanying drawings, which illustrate my invention, like characters indicate like parts throughout the several views.

Referring to the drawings:

Fig. 1 is a side elevation showing the improved temperature-maintaining apparatus connected to a heater of the character above referred to;

Fig. 3 is a section taken approximately on the line 3—3 of Fig. 1;

Fig. 4 is an enlarged view partly in elevation and partly in vertical section on the line 4—4 of Fig. 2;

Fig. 5 is a perspective with some parts broken away, showing the ignition valve of the temperature-maintaining apparatus removed from its casing; and Fig. 6 is a perspective with some parts broken away, showing the discharge valve of the apparatus removed from working position.

Figure 1:
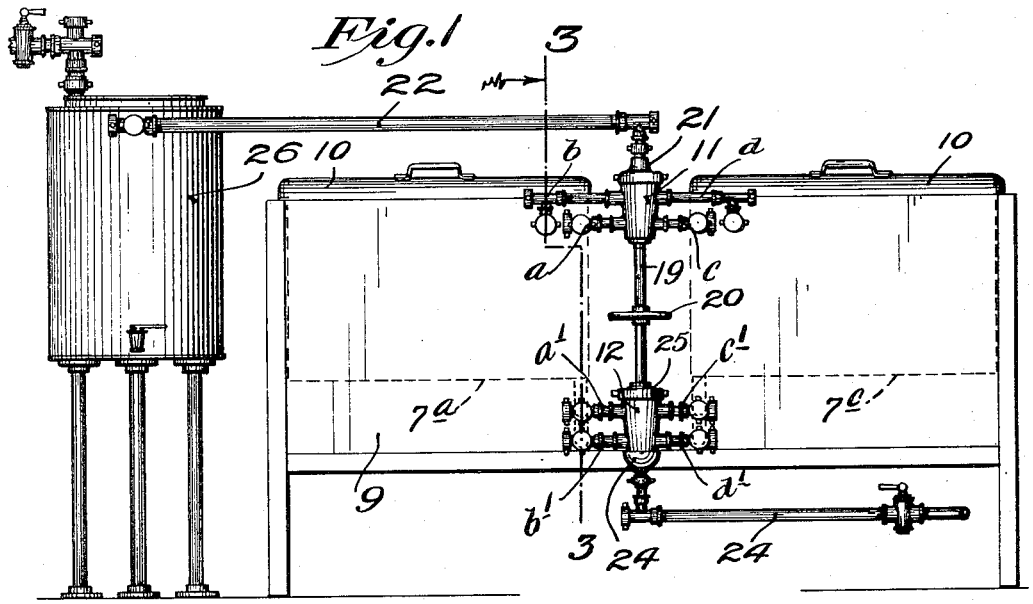
Figure 2:
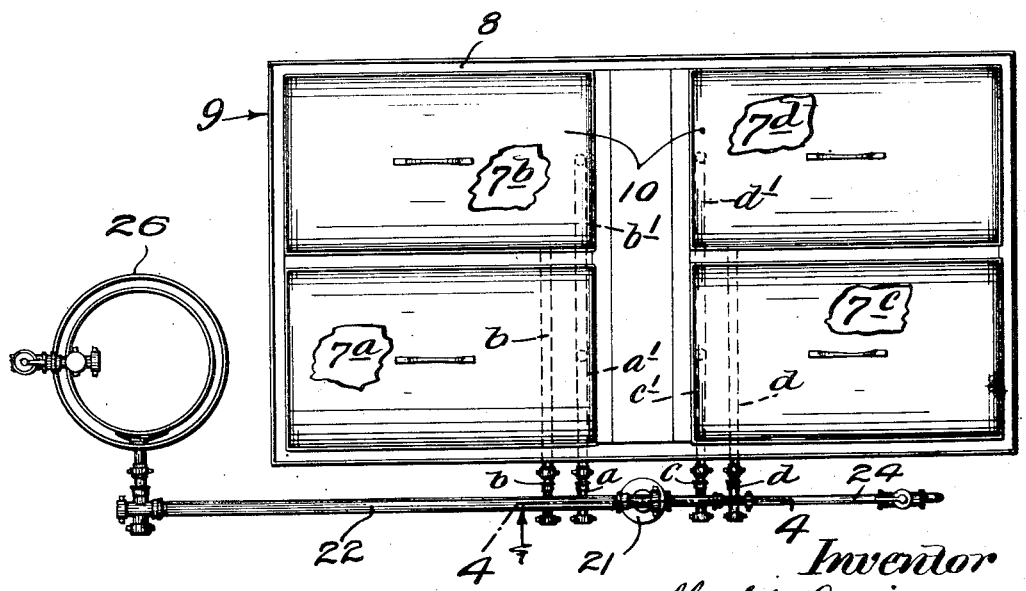
Fig. 2 is a plan view of the parts shown in Fig. 1.

The improved temperature-maintaining apparatus may involve any desired number of milk or cream-receiving kettles or compartments in rectangular arrangement with a hot-water-containing tank, but the apparatus illustrated involves four such kettles. These kettles are indicated by the numerals $7^a$, $7^b$, $7^c$, and $7^d$, and they are seated through the top plate 8 of a large tank 9 that contains hot water $y$ approximately to the level indicated in Fig. 3. The kettles are provided with removable covers 10. The milk or cream will be delivered to the kettles $7^a$, $7^b$, $7^c$ and $7^d$, respectively, through small intake pipes $a$, $b$, $c$ and $d$, and the milk or cream will be drawn off from the bottoms of said kettles, respectively, through discharge pipes $a^1$, $b^1$, $c^1$ and $d^1$. The supply pipes $b$ and $d$ lead, respectively, through the kettles $7^a$ and $7^c$ and all of the discharge pipes $a^1$, $b^1$, $c^1$ and $d^1$ are submerged in the hot water $y$. The intake pipes $a$, $b$, $c$ and $d$ are connected to a valve casing 11, respectively, by ports $a^2$, $b^2$, $c^2$ and $d^2$, while the discharge pipes $a^1$, $b^1$, $c^1$ and $d^1$ are connected to a valve casing 12, respectively, through ports $a^3$, $b^3$, $c^3$ and $d^3$.

The ports $a^2$, $b^2$, $c^2$ and $d^2$ are in a common vertical plane that intersects the valve casing 11, but the ports $a^2$ and $c^2$ are in a horizontal plane that is below the plane of the ports $b^2$ and $d^2$. The ports $a^3$, $b^3$, $c^3$ and $d^3$ are in a common vertical plane that diametrically intersects the valve casing 12, but the ports $b^3$ and $d^3$ are in a horizontal plane that is below the horizontal plane of the ports $a^3$ and $c^3$.

As preferably designed, the valve casings 11 and 12 are downwardly tapered and working therein, respectively, are correspondingly tapered valve heads 13 and 14. The valve 13 is the intake valve, is made hollow with open upper end and is formed with two ports 15 and 16. The port 15 is in the plane of the ports $a^2$ and $c^2$, while the port 16 is in the plane of the ports $b^2$ and $d^2$, but the port 15 is set circumferentially ninety degrees ahead of the port 16. The valve 14 is the discharge valve, is formed hollow with open lower end and is provided with ports 17 and 18. The port 17 is in the plane of the ports $a^3$ and $c^3$, while the port 18 is in the plane of the ports $b^3$ and $d^3$, but the port 17 is set circumferentially ninety degrees ahead of the port 18. The two valves 13 and 14 are connected for common simultaneous rotation by a connecting stem 19 shown as provided with a hand wheel 20 by means of which two valves may be simultaneously adjusted at will. The important relative arrangement of the two valves, the distributing ports and the intake and discharge pipes will be later noted.

The valve casing 11 has a screw-threaded cap 21, through which is tapped a milk or cream supply pipe 22. The valve casing 12, at its lower end, is provided with a screw-threaded cap 23, through which is tapped a milk or cream delivery pipe 24. Also, the valve casing 12 is shown as provided at its upper end with a screw-threaded cap 25, through which the valve stem 19 is passed.

Operation.

The temperature of the water in the main tank 9 may be maintained by any suitable or well known means, such as steam or hot water circulating pipes or a burner. In what may be assumed to be the starting position, although the starting may take place from any of the several positions of the valves, milk or cream is being admitted, through the port 15 of the intake valve 13 and through the pipe $a$, into the kettle $7^a$ and, at the same time, the cream or milk is being drawn off from the kettle $7^b$ through the discharge pipe $b^1$ and port 18 of the discharge valve 12. Thus, it will be seen that in the arrangement described, the milk or cream will be admitted into one kettle while it is being drawn off from another kettle, to wit: a kettle that is next in order in respect to the milking thereof as $7^a$, $7^b$, $7^c$ and $7^d$. This relation will be maintained for all of the open positions of the intake and discharge valves.

To specifically illustrate: When the two valves 11 and 12 are moved ninety degrees in the direction of the arrow marked on Fig. 4, from the position there shown, milk or cream will be delivered into the kettle $7^b$ and will be drawn off from the kettle $7^c$; when said valves are moved another ninety degrees, the milk or cream will be delivered into the kettle $7^c$ and will be drawn off from the kettle $7^d$; when said valves are given a third ninety degrees of movement, milk or cream will be delivered into the kettle $7^d$ and will be drawn off from the kettle $7^a$; and the fourth ninety degrees of rotation of said valves will, of course, bring the same back to the original position shown in Fig. 4. When the valves 11 and 12 are set in any position midway between the above noted positions affected by ninety degrees of rotation, all of the ports will be closed and there will be no flow of milk or cream to the apparatus through the supply pipe 22 or from the apparatus through the delivery pipe 24.

As is obvious, the apparatus described is what may be designated as "fool-proof," in that it does not require any skill or calculation to determine just which kettles or compartments should receive and which should be drained of the milk or cream. All that is necessary is to impart the ninety degree rotary steps of movement to the valves by manipulating the hand wheel 20. Of course, attention will be paid to the proper time or intervals between movements of the valves.

It is important to note that all of the delivery pipes $a$, $b$, $c$ and $d$ and all of the discharge pipes $a^1$, $b^1$, $c^1$ and $d^1$, though varying in length within the tank 9, have but short portions exposed outside of said tank so that the main portions thereof are kept at the same temperature by the liquid or vapors within said tank.

The apparatus has been described as a temperature-maintaining apparatus and its main purpose is to maintain above normal the temperature of milk, cream and the like, but it may be used also for maintaining relatively low temperatures where that result is desired. The apparatus is of simple construction, highly efficient for the purposes had in view and may be easily kept in sanitary condition.

The supply pipe 22 leads from the heating apparatus referred to in the earlier part of this description, and the heating apparatus is indicated as an entirety by the numeral 26.

What I claim is:

1. A temperature maintaining apparatus comprising a tank and a plurality of kettles located therein, an intake valve casing connected to a source of liquid supply, intake pipes leading from said casing to the several kettles, a discharge valve casing, discharge pipes leading from the several kettles to said discharge valve casing the major portions of said intake and discharge pipes being in the tank, and connected intake and discharge valves working respectively in said intake and discharge valve casings, said valves having ports arranged to progressively open said intake and discharge pipes, the one ahead of the other.

2. A temperature maintaining apparatus comprising a tank and a plurality of kettles located therein, an intake valve casing connected to a source of liquid supply, intake pipes leading from said casing to the several kettles, a discharge valve casing, discharge pipes leading from the several kettles to said discharge valve casing, and connected intake and discharge valves working respectively in said intake and discharge valve casings, said valves having ports arranged to progressively open said intake and discharge pipes, the one ahead of the other, said intake and discharge pipes being connected to their respective valve casings at diametrically opposite points and at different elevations and in which each of said valves is provided with two ports, the ports of a particular valve being set one ahead of the other.

3. The structure defined in claim 2 in which said valves are axially aligned and are connected by a common stem.

4. The structure defined in claim 1 in which said valve casings are outside of said tank but closely adjacent thereto and said intake and discharge pipes vary in length but are extended directly within said tank so that they are subjected to substantially the same temperature.

5. The structure defined in claim 2 in which said intake and discharge valves are hollow structures and said valve casings are hollow, and in further combination with a supply pipe connected to one extremity of said intake valve casing for delivery directly into said intake valve.

6. The structure defined in claim 2 in which said intake and discharge valves are hollow structures and said valve casings are hollow, in further combination with a supply pipe connected to one extremity of said intake valve casing for delivery directly into said intake valve, and a delivery pipe connected to the lower extremity of said discharge valve casing and receiving from the interior of said discharge valve.

In testimony whereof I affix my signature.

ALFRED J. DAVIS.